United States Patent (12) United States Patent
Yamamoto (10) Patent No.: US 11,232,336 B2
(45) Date of Patent: Jan. 25, 2022

(54) PRINTER APPARATUS, PRINTER SYSTEM, AND PRINT METHOD

(71) Applicant: SEIKO EPSON CORPORATION, Tokyo (JP)

(72) Inventor: Takayuki Yamamoto, Matsumoto (JP)

(*) Notice: Subject to any disclaimer, the term of this patent is extended or adjusted under 35 U.S.C. 154(b) by 0 days.

(21) Appl. No.: 16/774,510

(22) Filed: Jan. 28, 2020

(65) Prior Publication Data
US 2020/0250501 A1 Aug. 6, 2020

(30) Foreign Application Priority Data
Jan. 31, 2019 (JP) .............................. JP2019-015330

(51) Int. Cl.
*G06K 15/00* (2006.01)
*G06F 1/26* (2006.01)
*G06F 1/3234* (2019.01)

(52) U.S. Cl.
CPC ......... *G06K 15/4055* (2013.01); *G06F 1/266* (2013.01); *G06F 1/3284* (2013.01); *G06K 15/4005* (2013.01)

(58) Field of Classification Search
CPC .............................. G06K 15/4055; G06F 1/266
See application file for complete search history.

(56) References Cited

U.S. PATENT DOCUMENTS

| | | | |
|---|---|---|---|
| 2005/0005177 A1* | 1/2005 | Han | G06F 1/266 713/300 |
| 2009/0070604 A1* | 3/2009 | Kumakura | G06F 1/325 713/310 |
| 2016/0267367 A1* | 9/2016 | Uno | G06F 1/266 |

FOREIGN PATENT DOCUMENTS

JP 2004-034455 2/2004

* cited by examiner

*Primary Examiner* — Ibrahim Siddo
(74) *Attorney, Agent, or Firm* — Workman Nydegger (57) ABSTRACT

A printer apparatus that operates with power supplied by a power supply device includes: a printing unit that performs printing; a communication unit that is connected by USB to an external apparatus and supplies the power to the external apparatus; and a print control unit that causes the printing unit to perform printing in accordance with a print command received by the communication unit. When the printing unit performs the printing, the print control unit causes the communication unit to transmit a power-saving-enabling instruction that instructs the external apparatus to enter a power saving state.

10 Claims, 8 Drawing Sheets

PRINTER APPARATUS, PRINTER SYSTEM, AND PRINT METHOD

The present application is based on, and claims priority from JP Application Serial Number 2019-015330, filed Jan. 31, 2019, the disclosure of which is hereby incorporated by reference herein in its entirety.

BACKGROUND

1. Technical Field

The present disclosure relates to a printer apparatus, a printer system, and a print method.

2. Related Art

A printer apparatus that performs printing in accordance with a print command received from an external apparatus via a Universal Serial Bus (USB) interface is known. JP-A-2004-034455 discloses a printer apparatus supplied with power from a host computer.

For example, when the external apparatus is a single-board computer known as an Internet of Things (IoT) Box or the like, it is possible to supply power from a printer apparatus having a power supply device to the small-scale computer. In a system in which power is supplied from a printer apparatus to an external apparatus, it is desirable to save power as a whole.

SUMMARY

The present disclosure is a printer apparatus that operates with power supplied by a power supply device. The printer apparatus may include: a printing unit that performs printing; a communication unit that is connected by USB to an external apparatus and supplies the power to the external apparatus; and a print control unit that causes the printing unit to perform the printing in accordance with a print command received by the communication unit, and when the printing unit performs the printing, the print control unit may cause the communication unit to transmit a power-saving-enabling instruction that instructs the external apparatus to enter a power saving state.

Further, the present disclosure is a printer system including: a printer apparatus that operates with power supplied by a power supply device; and an external apparatus. The external apparatus may include a first communication unit that is connected by USB to the printer apparatus and receives the power from the printer apparatus, a communication control unit that causes the first communication unit to transmit a print command, and a power control unit that causes the external apparatus to enter a power saving state when a power-saving-enabling instruction that instructs the external apparatus to enter a power saving state is received by the first control unit. The printer apparatus may include a printing unit that performs printing, a second communication unit that is connected by USB to the external apparatus and supplies the power to the external apparatus, and a print control unit that causes the printing unit to perform printing in accordance with the print command received by the second communication unit, and the print control unit may cause the second communication unit to transmit the power-saving-enabling instruction when the printing unit performs the printing.

Furthermore, the present disclosure is a print method for a printer apparatus that operates with power supplied by a power supply device, is connected by USB to an external apparatus, and supplies the power to the external apparatus. The print method may include: a print command reception step of receiving a print command from the external apparatus; and a power-saving-enabling instruction step of transmitting, to the external apparatus, a power-saving-enabling instruction that instructs the external apparatus to enter a power saving state when performing printing in accordance with the print command.

DESCRIPTION OF EXEMPLARY EMBODIMENTS

Embodiments of the present disclosure will be described below. The embodiments described below are provided to merely illustrate an example of the present disclosure, and not all of the features illustrated in the embodiments may be required as a solution in the present disclosure.

(1) Summary of Technology Included in the Present Disclosure

First, a summary of technologies included in the present disclosure will be described with reference to examples illustrated in FIG. 1 to FIG. 11. Note that each of the drawings of the present application is a drawing schematically illustrating an example, the scales in respective directions illustrated in the drawings may differ from each other, and some of the drawings are not necessarily consistent with each other. The components of the present technology are not limited to the respective specific examples denoted by reference symbols. In the section "Summary of Technology Included in the Present Disclosure", text enclosed in parentheses refers to additional descriptions of the preceding term.

First Aspect

A printer apparatus according to one aspect of the present technology (for example, a printer 1 illustrated in FIG. 1 and FIG. 2) is a printer apparatus (1) that operates with power supplied by a power supply device 10. The printer apparatus (1) includes a printing unit 20 that performs printing, a communication unit (30) that is connected by USB to an external apparatus 100 and supplies power to the external apparatus 100 (for example, a second communication unit 30 illustrated in FIG. 2), and a print control unit 40 that causes the printing unit 20 to perform printing in accordance with a print command CM1 (for example, see FIG. 4) received by the communication unit (30). When the printing unit 20 performs the printing, the print control unit 40 causes the communication unit (30) to transmit a power-saving-enabling instruction CM2 that instructs the external apparatus 100 to enter a power saving state (for example, see FIG. 5). Herein, "USB connection" refers to a connection conforming to a USB standard, and "connected by USB" refers to being connected in accordance with a USB standard.

Figure 10:
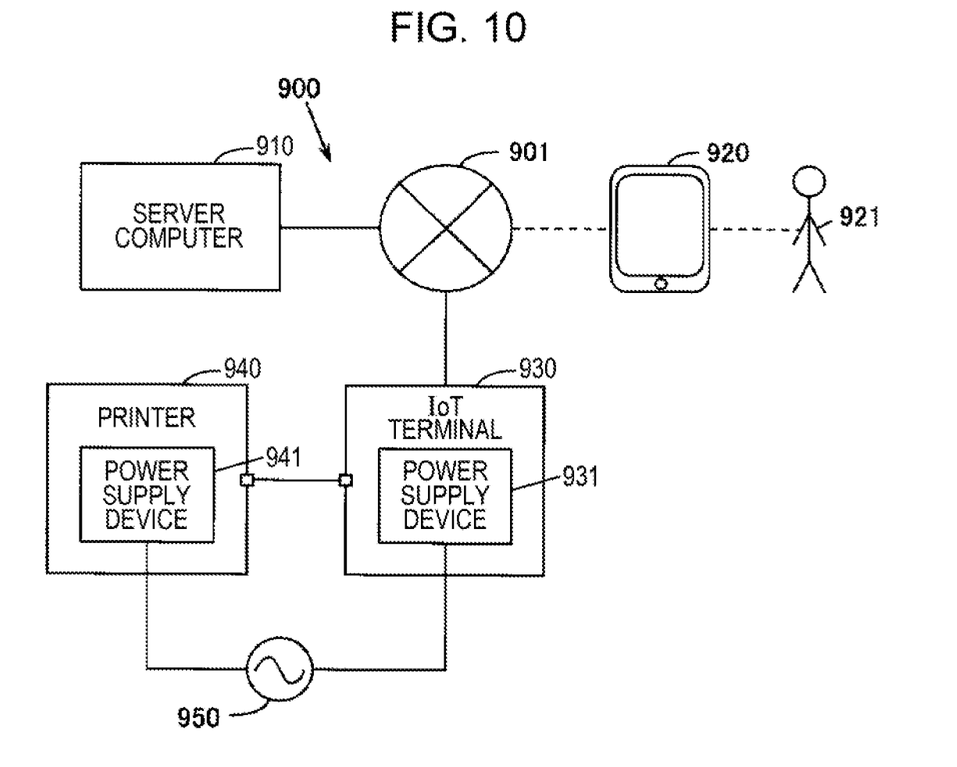
FIG. 10 is a block diagram schematically illustrating a printer system including an IoT terminal and a printer as a comparative example.

FIG. 10 schematically illustrates a printer system 900 including an IoT terminal 930 and a printer (printer apparatus) 940 as a comparative example. A server computer 910 that manages the system 900, a mobile terminal 920 such as a smartphone, and the IoT terminal 930 that is an information processing device are connected to the Internet 901 in a wired or wireless manner. The IoT terminal 930 is connected by USB to the printer 940 via a USB cable. When a user 921 operates the mobile terminal 920 and thereby the mobile terminal 920 transmits print data to the IoT terminal 930 via the Internet 901, the IoT terminal 930 converts the print data into a print command. When the IoT terminal 930 transmits the print command to the printer 940 via the USB cable, the printer 940 performs printing in accordance with the print command.

An electronic device operates with a direct current power supply and thus requires a power supply device that converts alternating current of a commercial power supply into direct current. In the system 900 described above, a power supply device 941 is provided in the printer 940, and a power supply device 931 that differs from the power supply device 941 is provided in the IoT terminal 930. The power supply devices 931 and 941 are connected to a commercial power supply 950 and convert alternating current of the commercial power supply 950 into direct current. When a printer and an IoT terminal have respective power supply devices, however, both the printer and the IoT terminal are required to be connected to the commercial alternating current power supply, and thus the physical arrangement of these devices may be limited.

Figure 9:
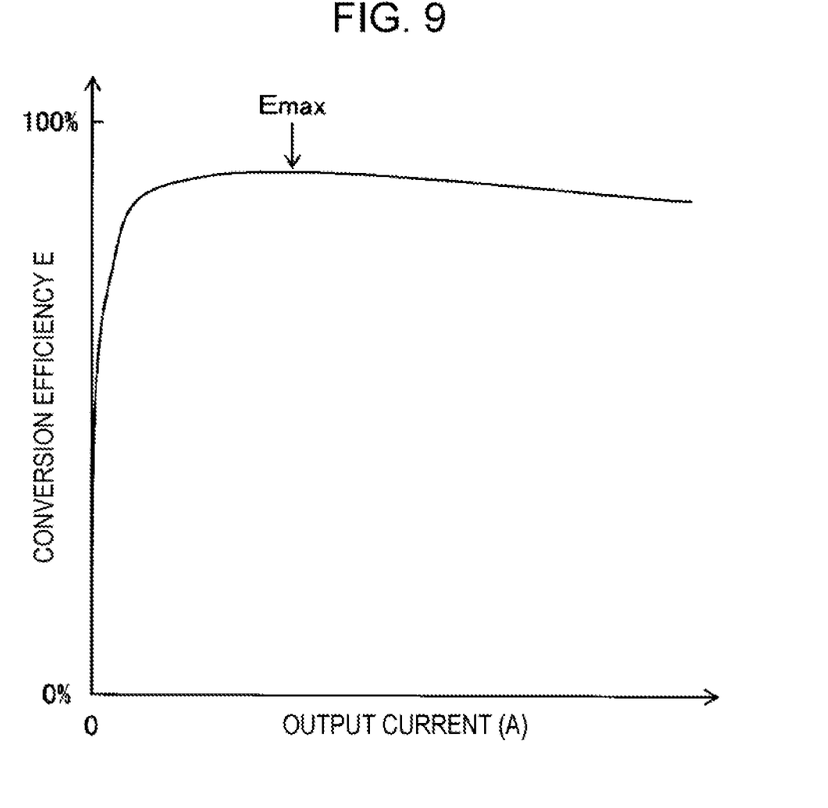
FIG. 9 is a diagram schematically illustrating an example of conversion efficiency of a power supply device that converts commercial alternating current power supply into a constant direct current output voltage.

When a printer apparatus and an external apparatus share a power supply device, there are problems, such as described below, with respect to the conversion efficiency of the power supply device. FIG. 9 schematically illustrates an example of conversion efficiency of a power supply device that converts alternating current from a commercial power supply into a constant direct current voltage. Since loss occurs when a power supply device converts alternating current into direct current, the power conversion efficiency will be less than 100%. Conversion efficiency depends on output current. Conversion efficiency decreases both when the output current is larger than an output current which provides the maximum efficiency Emax and when the output current is smaller than the output current which provides the maximum efficiency Emax.

A printer apparatus has a drive unit such as a recording head, a sheet feeder, or the like and therefore consumes relatively high power at the time of printing and consumes relatively low power at the time of being in standby for printing. In such a way, power demand significantly varies in a printer apparatus. When power is supplied from a printer apparatus to an external apparatus, the power consumption values of respective apparatuses increase and decrease, and peaks of the power consumption of respective apparatuses may coincide with each other by chance.

Figure 11:
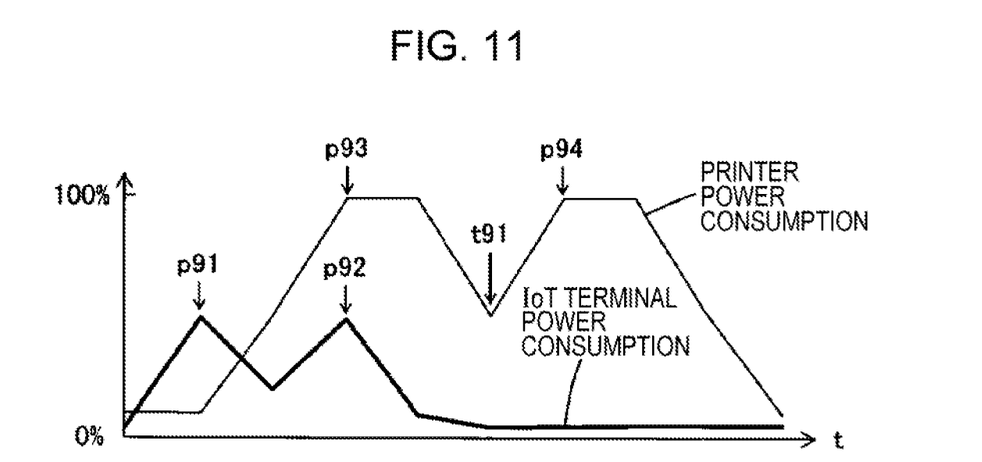
FIG. 11 is a diagram schematically illustrating an example of power consumption of a printer and an IoT terminal as a comparative example.

As a comparative example, FIG. 11 schematically illustrates power consumption of a printer and an IoT terminal when two print jobs are processed in succession. In FIG. 11, the horizontal axis represents time t, the vertical axis represents relative power consumption percent, the thin line indicates the power consumption of the printer, except for a power supply device thereof, and the thick line indicates the power consumption of the IoT terminal. The power supply device is designed such that the power conversion efficiency is highest when the power consumption of the printer is at a peak. Peaks p91 and p92 in the power consumption of the IoT terminal occur when print data is converted into a print command, and peaks p93 and p94 in the power consumption of the printer occur when printing is performed. The peaks p93 and p94 occur after the peaks p91 and p92, and the peak p92 of the power consumption of the IoT terminal and the peak p93 of the power consumption of the printer coincide with each other by chance. If the power consumption values of both apparatuses exceed the rated value of the power supply device, a power shortage may cause abnormal operation of the printer or the IoT terminal. Even if the power consumption value of each apparatus does not exceed the rated value, a reduction in the power conversion efficiency of the power supply device may cause unnecessary power consumption or heat generation. Further, at the time t91 between the peak p93 and the peak p94, since total power consumption of the printer and the IoT terminal is small, the power conversion efficiency decreases.

In the first aspect described above, the communication unit (30) connected by USB to the external apparatus 100 supplies power to the external apparatus 100, and when the printing unit 20 performs printing in accordance with the print command CM1 received by the communication unit (30), the communication unit (30) transmits a power-saving-enabling instruction CM2 to the external apparatus 100. When the external apparatus 100 that has received the power-saving-enabling instruction CM2 enters a power saving state, the power consumption of the external apparatus 100 is suppressed at the time of printing, which consumes relatively high power, and a reduction in the power conversion efficiency of the power supply device 10 is suppressed. Therefore, the present aspect may improve the power saving performance of a printer apparatus that supplies power by USB to an external apparatus.

Herein, the time when the print control unit causes the communication unit to transmit the power-saving-enabling instruction may be any time as long as it is associated with the start time of printing when the printing unit starts printing. Therefore, the time described above may be the same as the start time of printing, earlier than the start time of printing, or later than the start time of printing. The first aspect described above may include any of the times described above. Note that the additional remarks described above are applied to aspects described below.

Second Aspect

Figure 3:
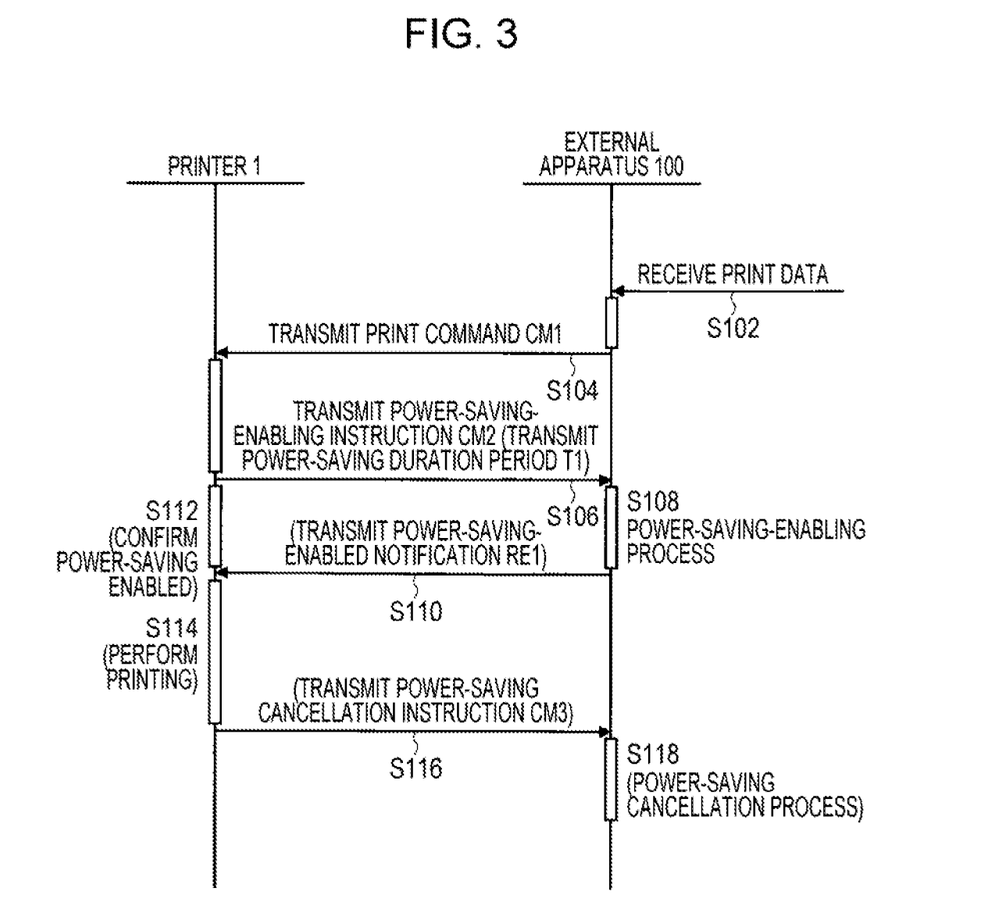
FIG. 3 is a sequence diagram illustrating an example of a process in the printer system.

As illustrated in FIG. 3 and the like, the print control unit 40 may cause the printing unit 20 to perform printing after confirming that the external apparatus 100 enters a power saving state. With printing being performed after the external apparatus 100 enters a power saving state, the power consumption of the external apparatus 100 is more reliably suppressed at the time of printing, which consumes relatively high power, and a reduction in the power conversion efficiency of the power supply device 10 is further suppressed. Therefore, the present aspect may further improve the power saving performance of a printer apparatus that supplies power by USB to an external apparatus. Herein, switching to a power saving state of the external apparatus can be confirmed from a reduction in the current supplied to the external apparatus, a reduction in the current output by the power supply device, reception of a power-saving-enabled notification from the external apparatus indicating switching to a power saving state, or the like.

Third Aspect

As illustrated in FIG. 3 and the like, the print control unit 40 may cause the communication unit (30) to transmit a power-saving cancellation instruction CM3 that cancels the power saving state upon completion of printing performed by the printing unit 20. The external apparatus 100 that has received the power-saving cancellation instruction CM3 cancels a power saving state after the power consumption of the printer apparatus (1) decreases in response to completion of printing. Therefore, the present aspect may cause an external apparatus to perform a more efficient process. Note that, although not included in the third aspect, at the time of transmission of a power-saving-enabling instruction, the printer apparatus may transmit a power-saving preservation period indicating a period during which a power saving state is maintained. The external apparatus that has received the power-saving preservation period cancels a power saving state when the power-saving preservation period expires, and thereby a more efficient process is performed in the external apparatus.

Fourth Aspect

Further, a printer system SY1 according to one aspect of the present technology includes the external apparatus 100 and the printer apparatus (1) that operates with power supplied by the power supply device 10. The external apparatus 100 includes a first communication unit 130 that is connected by USB to the printer apparatus (1) and receives the power from the printer apparatus (1), a communication control unit 140 that causes the first communication unit 130 to transmit the print command CM1, and a power control unit 150 that causes the external apparatus 100 to enter a power saving state when a power-saving-enabling instruction CM2 that instructs the external apparatus 100 to enter a power saving state is received by the first communication unit 130. The printer apparatus (1) has the printing unit 20 that performs printing, the second communication unit 30 that is connected by USB to the external apparatus 100 and supplies the power to the external apparatus 100, and the print control unit 40 that causes the printing unit 20 to perform printing in accordance with the print command CM1 received by the second communication unit 30. When the printing unit 20 performs the printing, the print control unit 40 causes the second communication unit 30 to transmit the power-saving-enabling instruction CM2.

In the fourth aspect described above, the second communication unit 30 of the printer apparatus (1) supplies power to the external apparatus 100, and the first communication unit 130 of the external apparatus 100 transmits the print command CM1 to the printer apparatus (1). The printer apparatus (1) that has received the print command CM1 transmits the power-saving-enabling instruction CM2 to the external apparatus 100 when performing printing. The external apparatus 100 that has received the power-saving-enabling instruction CM2 enters a power saving state.

Accordingly, the power consumption of the external apparatus 100 is suppressed at the time of printing, which consumes relatively high power, and a reduction in the power conversion efficiency of the power supply device 10 is suppressed. Therefore, the present aspect may improve the power saving performance of a printer apparatus that supplies power by USB to an external apparatus. Herein, the terms "first" and "second" are used for identifying each component included in a plurality of components that are similar to each other. Note that the additional remarks above are applied to aspects described below.

Fifth Aspect

Furthermore, a print method according to one aspect of the present technology is a print method for the printer apparatus (1) that operates with power supplied by the power supply device 10, that is connected by USB to the external apparatus 100, and that supplies the power to the external apparatus 100. The print method includes a print command reception step ST1 of receiving the print command CM1 from the external apparatus 100 (for example, see FIG. 4) and a power-saving-enabling instruction step ST2 of transmitting, to the external apparatus 100, the power-saving-enabling instruction CM2 that instructs the external apparatus 100 to enter a power saving state when printing is performed in accordance with the print command CM1 (for example, see FIG. 5).

In the fifth aspect described above, when printing is performed in accordance with the print command CM1 received from the external apparatus 100, the power-saving-enabling instruction CM2 is transmitted to the external apparatus 100. When the external apparatus 100 that has received the power-saving-enabling instruction CM2 enters a power saving state, the power consumption of the external apparatus 100 is suppressed at the time of printing, which consumes relatively high power, and a reduction in the power conversion efficiency of the power supply device 10 is suppressed. Therefore, the present aspect may improve the power saving performance of a printer apparatus that supplies power by USB to an external apparatus.

Furthermore, the present technology is applicable to a multifunction apparatus and also to the printer apparatus described above, a print method for the printer system described above, a control program of the printer apparatus described above, a control program of the external apparatus described above, a computer readable medium storing any of the control programs described previously, or the like. Some of the apparatuses described previously may be formed of a plurality of separate components.

Figure 1:
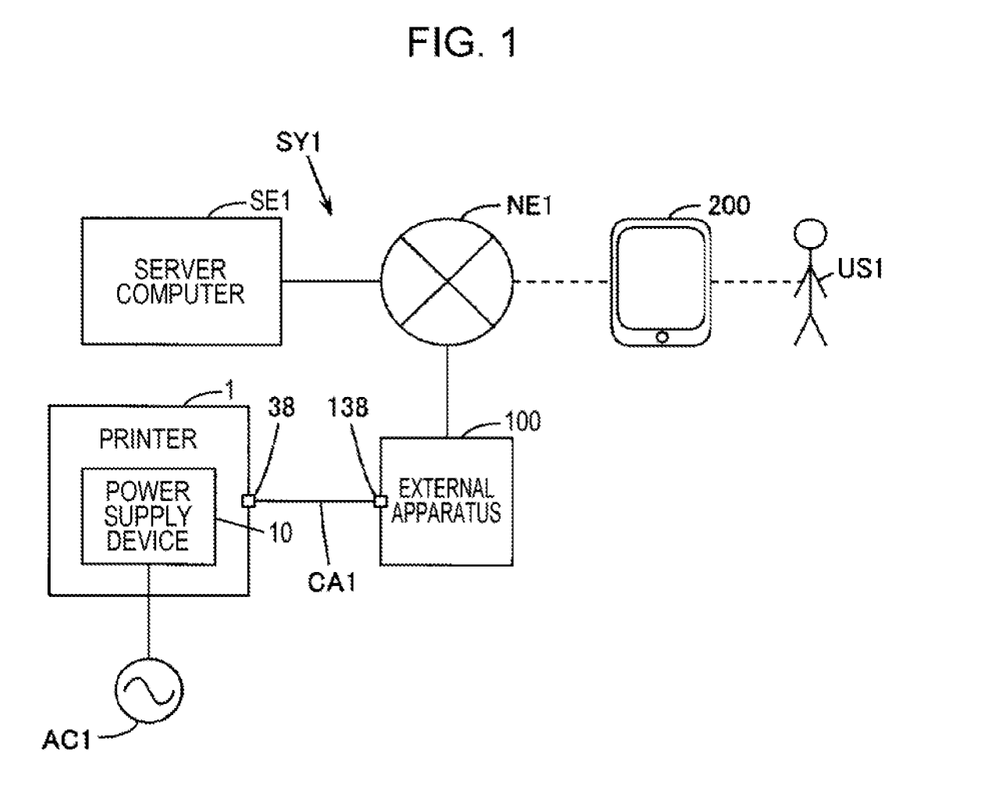
FIG. 1 is a block diagram schematically illustrating a configuration example of a printer system including a printer apparatus and an external apparatus.

(2) Specific Example of Configuration of Printer System Including Printer Apparatus and External Apparatus FIG. 1 schematically illustrates a specific example of the configuration of a printer system including a printer apparatus and an external apparatus. In FIG. 1, a printer 1 is an example of the printer apparatus of the present technology. Although the printer 1 of the present specific example is an ink jet printer, the printer 1 may be, for example, an electro-photographic printer such as a laser printer. Further, the printer 1 may be a copy machine, a fax machine, a multifunction printer having the functions thereof, or the like. Although the external apparatus 100 of the present specific example is a small-scale IoT terminal known as an IoT Box, the external apparatus 100 may be, for example, a personal computer such as a tablet terminal as long as it operates with power supplied from the printer 1. Note that, although not called a personal computer, a small-scale IoT terminal does not differ from a personal computer in terms of basic configuration.

The printer system SY1 illustrated in FIG. 1 includes a server computer SE1 that manages the printer system SY1, the printer 1, the external apparatus 100 that is an information processing apparatus, and a mobile terminal 200 such as a smartphone. The server computer SE1, the external apparatus 100, and the mobile terminal 200 are connected to the Internet NE1 in a wired or wireless manner. The external apparatus 100 is not connected to the commercial alternating current power supply AC1 but has a first USB connector 138 conforming to the Type-C standard and is supplied with direct current power from the printer 1. The printer 1 has the power supply device 10 that converts alternating current from the alternating current power supply AC1 into direct current and a second USB connector 38 conforming to the Type-C standard. The first USB connector 138 and the second USB connector 38 are connected via a USB cable CA1 conforming to the Type-C standard. Once a user US1 operates the mobile terminal 200 and thereby the mobile terminal 200 transmits print data to the external apparatus 100 via the Internet NE1, the external apparatus 100 converts the print data into a print command. The external apparatus 100 transmits the print command to the printer 1 via the USB cable CA1, and the printer 1 then performs printing in accordance with the print command.

Figure 2:
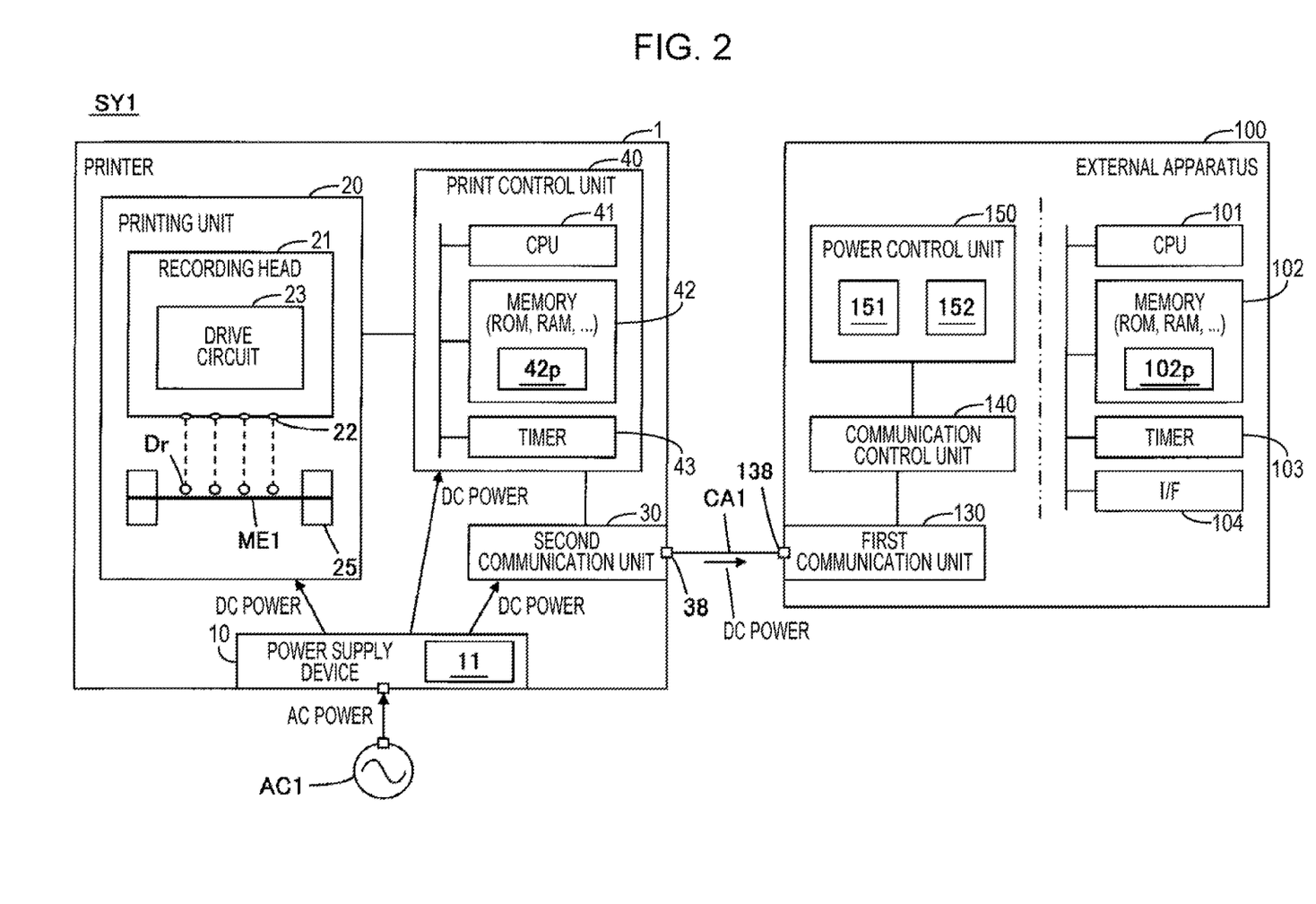
FIG. 2 is a block diagram schematically illustrating a configuration example of the printer apparatus and the external apparatus.

FIG. 2 schematically illustrates an example configured to save power of the printer system SY1 as a whole. In FIG. 2, "AC power" indicates alternating current power, and "DC power" indicates direct current power. The printer 1 included in the printer system SY1 has the power supply device 10, the printing unit 20, the second communication unit 30, and the print control unit 40.

The power supply device 10 has a current measuring unit 11 and is connected to the alternating current power supply AC1, which is the commercial power supply, and generates direct current output power from the alternating current of the alternating current power supply AC1. The output power from the power supply device 10 is supplied to the printing unit 20, the second communication unit 30, and the print control unit 40. Therefore, the printer 1 operates in accordance with the output power of the power supply device 10. The current measuring unit 11 measures the current output by the power supply device 10. Note that, when the external apparatus 100 is configured to return a power-saving-enabled notification RE1 as illustrated in FIG. 3, the current measuring unit 11 may be omitted from the power supply device 10.

The printing unit 20 has a recording head 21 that discharges droplets Dr such as ink droplets onto a print substrate ME1 and a sheet feeder unit 25 that transports the print substrate ME1. When the printer 1 is a serial printer having a carriage of the recording head 21, a drive unit that moves the carriage is provided in the printing unit 20. The recording head 21 has a plurality of nozzles 22 from which droplets Dr are discharged and a drive circuit 23 that causes respective nozzles 22 to eject the droplets Dr. For the drive circuit 23, a circuit that drives piezoelectric elements each configured to add pressure to a liquid in a pressure chamber in communication with each nozzle 22, a circuit that drives thermal elements each configured to generate a foam by heat in a liquid in each pressure chamber, or the like may be used. When the droplets Dr are discharged onto the print substrate ME1 transported by the sheet feeder unit 25, a printed image corresponding to print data is formed on the print substrate ME1. Note that a print substrate is a material that retains a printed image. For a print substrate, paper, a resin, a metal, or the like may be used. Although the shape of the print substrate is typically rectangular or rolled, the shape may be substantially circular such as with an optical disc, polygonal other than rectangular, three-dimensional, or the like.

The second communication unit 30 has the second USB connector 38 described above. The second USB connector 38 has a bus power line, a data line, or the like and is connected to the first USB connector 138 via the USB cable CA1. Accordingly, the second communication unit 30 is connected by USB to the external apparatus 100. The bus power line of the second USB connector 38 of the present specific example supplies power to the external apparatus 100. For example, when the second USB connector 38 conforms to the Type-C standard, the bus power line can supply power from the external apparatus 100 to the printer 1 and can supply power from the printer 1 to the external apparatus 100. As described above, the second communication unit 30 supplies the output power from the power supply device 10 to the external apparatus 100.

Note that the second communication unit 30 may have a bus-power line current measuring unit that measures the current value flowing on the bus power line of the second USB connector 38. In such a case, it is not essential that the power supply device 10 have the current measuring unit 11.

The second communication unit 30 can receive the print command CM1 or the like illustrated in FIG. 3 and transmit the power-saving-enabling instruction CM2 or the like illustrated in FIG. 3. The print command CM1 is a command that causes a printed image based on print data to be formed on the printer 1. The power-saving-enabling instruction CM2 is an instruction that instructs the external apparatus 100 to enter a power saving state from a normal operation state. Reception of the print command CM1 or the like and transmission of the power-saving-enabling instruction CM2 or the like may conform to a definition of a USB standard or may conform to a custom definition. For example, when the second USB connector 38 conforms to the Type-C standard, it is possible to transmit the power-saving-enabling instruction CM2 by using a command used for transmitting a USB Power Delivery GotoMin message on the Configuration Channel. Taking transmission of the power-saving cancellation instruction CM3 or the like illustrated in FIG. 3 into consideration, a custom definition may be employed for transmission of the power-saving-enabling instruction CM2.

The print control unit 40 has a central processing unit (CPU) 41, a memory device 42, a timer circuit 43, or the like and causes the printing unit 20 to perform printing in accordance with a print command received by the second communication unit 30. The memory device 42 includes a read-only memory (ROM) that is a semiconductor memory, a random access memory (RAM) that is a semiconductor memory, and a data-rewritable nonvolatile memory. For the nonvolatile memory, nonvolatile semiconductor memory such as flash memory, a magnetic storage device such as a hard disk, or the like may be used. The memory device 42 stores a control program 42p used for performing the print method of the present specific example. The CPU 41 executes the program 42p by using the RAM as a work area and thereby causes the printer 1, which is a computer, to implement the function configured to perform the print method of the present specific example.

The external apparatus 100 illustrated in FIG. 2 has a CPU 101, a memory device 102, a timer circuit 103, an interface (I/F) 104, the first communication unit 130, or the like and operates with power supplied from the printer 1. The memory device 102 includes a ROM that is a semiconductor memory, a RAM that is a semiconductor memory, and a data-rewritable nonvolatile memory. For the nonvolatile memory, nonvolatile semiconductor memory such as flash memory, a magnetic storage device such as a hard disk, or the like may be used. The memory device 102 stores a control program 102p that causes the external apparatus 100, which is a computer, to function as the communication control unit 140 and the power control unit 150. The I/F 104 includes a network I/F that communicates with the mobile terminal 200 or the like via the Internet NE1. The CPU 101 executes the program 102p by using the RAM as a work area and thereby causes the external apparatus 100 to implement the function configured to perform the print method of the present specific example.

The first communication unit 130 has the first USB connector 138 described above. The first USB connector 138 has a bus power line, a data line, or the like and is connected to the second USB connector 38 through the USB cable CA1. Accordingly, the first communication unit 130 is connected by USB to the printer 1. The bus power line of the first USB connector 138 of the present specific example can receive power from the printer 1. For the first USB connector 138, a USB connector conforming to the Type-C standard may be used, for example. As described above, the first communication unit 130 receives the output power from the printer 1.

The first communication unit 130 can transmit the print command CM1 or the like illustrated in FIG. 3 and can receive the power-saving-enabling instruction CM2 or the like illustrated in FIG. 3. Transmission of the print command CM1 or the like and reception of the power-saving-enabling instruction CM2 or the like may conform to a definition of a USB standard or may conform to a custom definition.

The communication control unit 140 causes the first communication unit 130 to transmit the print command CM1 or the like illustrated in FIG. 3 to the printer 1 and recognizes the power-saving-enabling instruction CM2 or the like received by the first communication unit 130.

The power control unit 150 has a clock control unit 151 and a sleep control unit 152 and causes the external apparatus 100 to enter a power saving state from a normal operation state when the power-saving-enabling instruction CM2 illustrated in FIG. 3 is received by the first communication unit 130. The clock control unit 151 can change the clock frequency used for operating the CPU 101. For example, the clock frequency in a normal state is fn (Hz), and the clock frequency in a clock-down state is fd (Hz), where 0<fd<fn. In such a case, the clock control unit 151 sets the clock used for operating the CPU 101 to the frequency fn in a normal state and to the frequency fd in a clock-down state. The sleep control unit 152 switches the external apparatus 100 from a normal operation state to a sleep state or from a sleep state to a normal operation state. The sleep state is a state where the external apparatus 100 suspends a process of converting print data into a print command. The external apparatus 100 in the sleep state performs the minimum operation intended for recovery to the normal operation state, for example, a process of determining expiration of a power-saving preservation period T1 by using the timer circuit 103 or a process of receiving the power-saving cancellation instruction CM3 by using the first communication unit 130. Note that one of the clock control unit 151 and the sleep control unit 152 may be omitted.

(3) Specific Example of Process in Printer System

FIG. 3 schematically illustrates a print process in the printer system SY1. In FIG. 3, text enclosed in parentheses denotes processes that may be omitted. Herein, step S104 corresponds to the print command reception step ST1 illustrated in FIG. 4 as an example. Step S106 corresponds to the power-saving-enabling instruction step ST2 illustrated in FIG. 5 as an example. Step S114 corresponds to the print execution step ST3 illustrated in FIG. 6 as an example. Step S116 corresponds to the power-saving cancellation step ST4 illustrated in FIG. 7 as an example. The word "step" will be omitted below. Before the process on and after S102, it is assumed that the external apparatus 100 is in a normal operation state.

Figure 4:
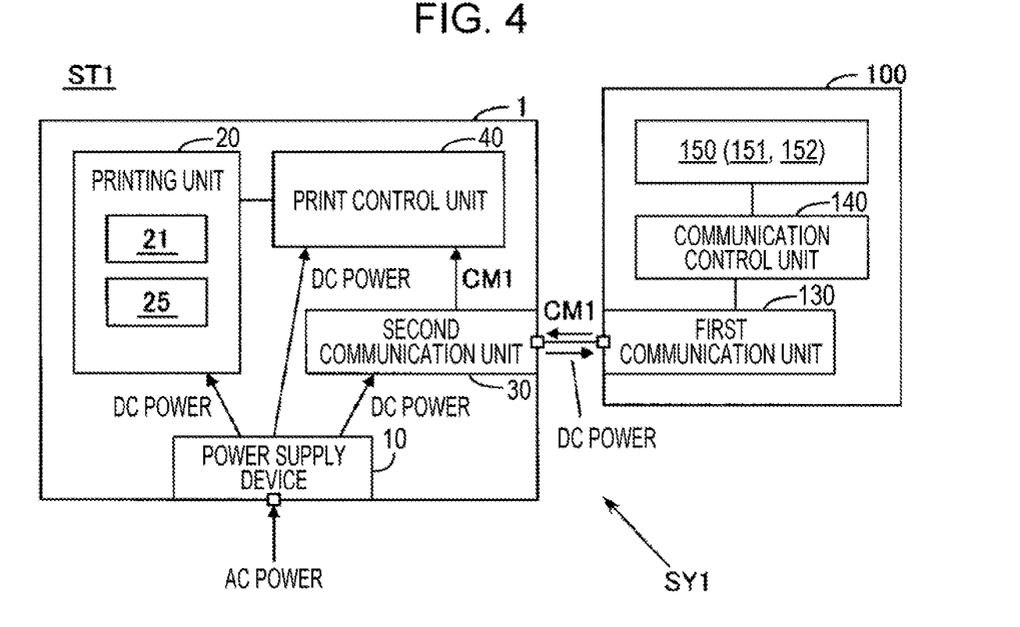
FIG. 4 is a block diagram schematically illustrating an example of a power supply state in a print command reception step.

Once the mobile terminal 200 illustrated in FIG. 1 transmits print data to the external apparatus 100, in S102, the first communication unit 130 of the external apparatus 100 receives the print data, and the communication control unit 140 acquires the print data. In S104, the communication control unit 140 of the external apparatus 100 converts print data into the print command CM1 and causes the first communication unit 130 to transmit the print command CM1. In the printer 1, the second communication unit 30 receives the print command CM1, and the print control unit 40 acquires the print command CM1. At this time, as illustrated in FIG. 4, DC power from the power supply device 10 is supplied to the printing unit 20, the second communication unit 30, and the print control unit 40, and DC power is transmitted from the second communication unit 30 to the first communication unit 130. Since the printing unit 20 is not performing printing, the power consumption of the printing unit 20 is small. The power consumption of the external apparatus 100 in the normal operation state is large because of a process of converting print data into the print command CM1 and a process of transmitting the print command CM1.

Figure 5:
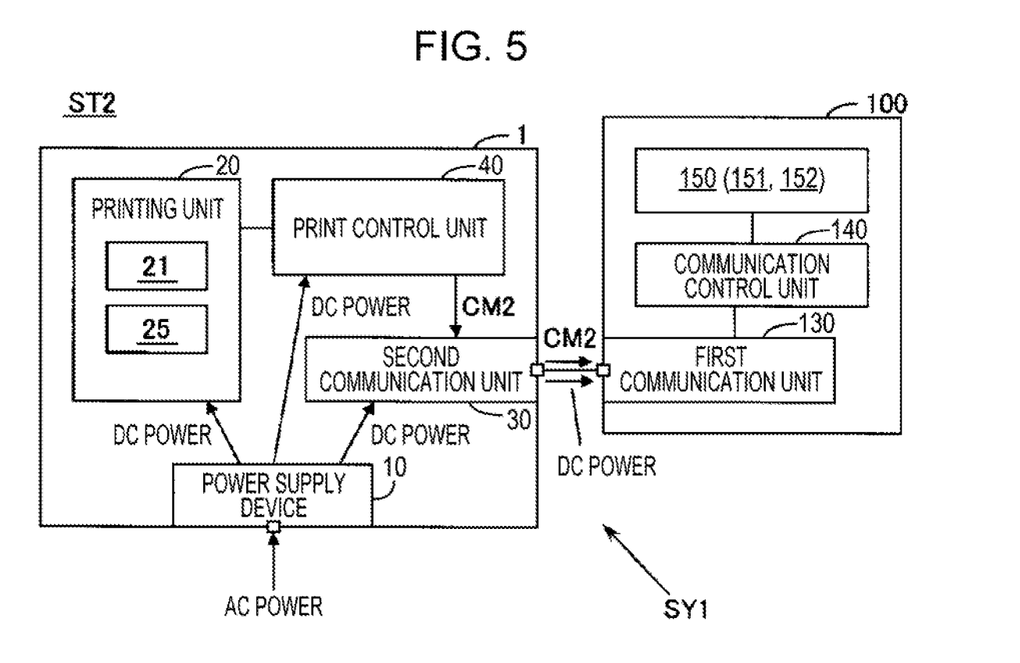
FIG. 5 is a block diagram schematically illustrating an example of a power supply state in a power-saving-enabling instruction step.

In S106, the print control unit 40 of the printer 1 causes the second communication unit 30 to transmit the power-saving-enabling instruction CM2 that instructs the external apparatus 100 to enter a power saving state from the normal operation state. Therefore, before a drive signal is transmitted to the printing unit 20, the power-saving-enabling instruction CM2 is transmitted to the external apparatus 100. In the external apparatus 100, the first communication unit 130 receives the power-saving-enabling instruction CM2, and the communication control unit 140 and the power control unit 150 recognize the power-saving-enabling instruction CM2. Also at this time, as illustrated in FIG. 5, the DC power from the power supply device 10 is supplied to the printing unit 20, the second communication unit 30, and the print control unit 40, and the DC power is transmitted from the second communication unit 30 to the first communication unit 130. Since the printing unit 20 is not performing printing, the power consumption of the printing unit 20 is small.

Further, at the time of transmission of the power-saving-enabling instruction CM2, the print control unit 40 may transmit the power-saving preservation period T1 indicating a period during which the power-saving state is maintained. The print control unit 40 may estimate a print execution period required for printing in accordance with the print command CM1 and determine the power-saving preservation period T1 in accordance with the print execution period. When the external apparatus 100 can confirm or estimate completion of printing without receiving the power-saving preservation period T1, it is unnecessary to transmit the power-saving preservation period T1.

In S108, the power control unit 150 of the external apparatus 100 performs a power-saving-enabling process that causes the external apparatus 100 to enter the power saving state from the normal operation state when the power-saving-enabling instruction CM2 is received by the first communication unit 130.

When the power saving state occurs in a clock-down state, the clock control unit 151 of the power control unit 150 switches the operation clock of the CPU 101 from the frequency fn of the normal state to the frequency fd of the clock-down state. Thereby, the external apparatus 100 performs an operation for a power saving state at the relatively low frequency fd, and a low rate process is performed in the external apparatus 100. As a result of a reduction in power consumption of the external apparatus 100, the current flowing on the bus power line of the USB cable CA1 decreases, and the DC power supplied from the second communication unit 30 of the printer 1 to the first communication unit 130 of the external apparatus 100 as illustrated FIG. 6 decreases.

When the power saving state occurs in a sleep state, the sleep control unit 152 of the power control unit 150 switches the external apparatus 100 from the normal operation state to the sleep state. Thereby, the external apparatus 100 performs only the minimum operation in the sleep state, and the power consumption of the external apparatus 100 decreases. As a result, the current flowing on the bus power line of the USB cable CA1 decreases, and the DC power supplied from the second communication unit 30 of the printer 1 to the first communication unit 130 of the external apparatus 100 as illustrated FIG. 6 decreases.

In S110, the communication control unit 140 of the external apparatus 100 that enters the power saving state from the normal operation state may cause the first communication unit 130 to transmit the power-saving-enabled notification RE1 indicating that the power saving state has been enabled. In such a case, in the printer 1, the second communication unit 30 receives the power-saving-enabled notification RE1, and the print control unit 40 recognizes the power-saving-enabled notification RE1. When the printer 1 can confirm or estimate, without receiving the power-saving-enabled notification RE1, that the external apparatus 100 has entered the power saving state, it is unnecessary to transmit the power-saving-enabled notification RE1.

While the process of S108 to S110 is being performed in the external apparatus 100, the print control unit 40 of the printer 1 may perform, a power-saving-enabled confirmation process in S112 for confirming that the external apparatus 100 has entered the power saving state. When the external apparatus 100 transmits the power-saving-enabled notification RE1 to the printer 1, switching to the power saving state is confirmed when the second communication unit 30 of the printer 1 receives the power-saving-enabled notification RE1. Accordingly, the print control unit 40 of the printer 1 may perform the process of S114 of performing printing in response to the second communication unit 30 receiving the power-saving-enabled notification RE1. When the power supply device 10 has the current measuring unit 11, switching to the power saving state is confirmed when the current value measured by the current measuring unit 11 decreases. Accordingly, the print control unit 40 of the printer 1 may perform the process of S114 of performing printing in response to a reduction in the current value measured by the current measuring unit 11 by a predetermined value or greater. Note that, although it is preferable that the power-saving-enabled confirmation process be performed in view of improving power-saving performance, it is possible to start the process of S114 immediately after the process of S106 of transmitting the power-saving-enabling instruction CM2 is performed. Further, a time lag may occur between completion of the power-saving-enabling process of S108 and start of the process of S114.

Figure 6:
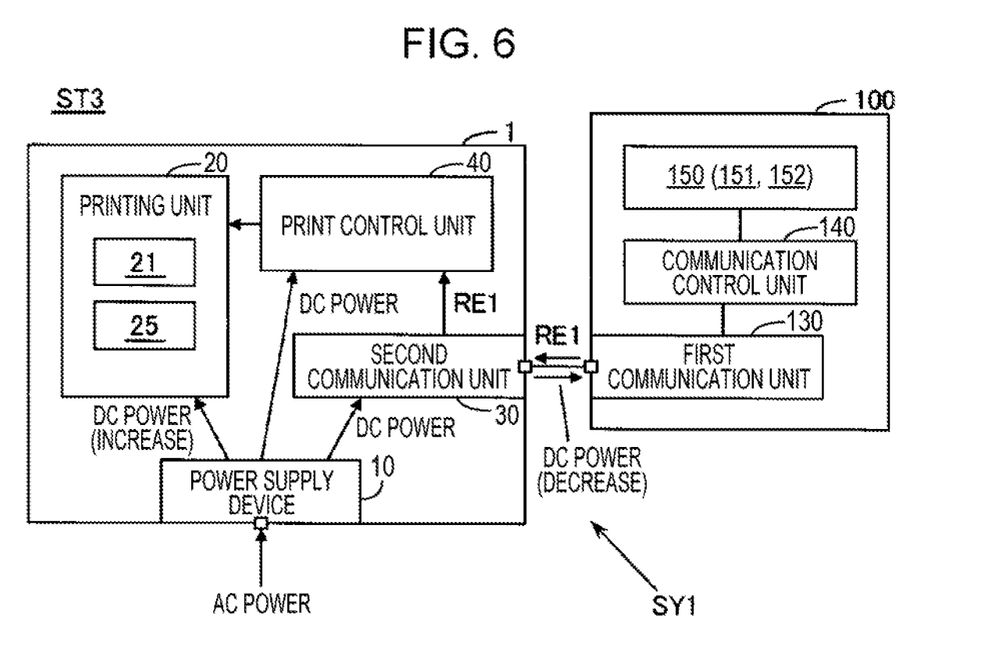
FIG. 6 is a block diagram schematically illustrating an example of a power supply state in a print execution step.

In S114, the print control unit 40 of the printer 1 generates a drive signal of the printing unit 20 in accordance with the print command CM1, supplies the drive signal to the printing unit 20, and thereby causes the printing unit 20 to perform printing in accordance with the print command CM1. Accordingly, a printed image corresponding to the print data is formed on the print substrate ME1. At this time, as illustrated in FIG. 6, the DC power transmitted from the second communication unit 30 to the first communication unit 130 is already reduced, and the DC power supplied from the power supply device 10 to the printing unit 20 increases. Upon completion of the printing, the DC power supplied from the power supply device 10 to the printing unit 20 decreases.

Figure 7:
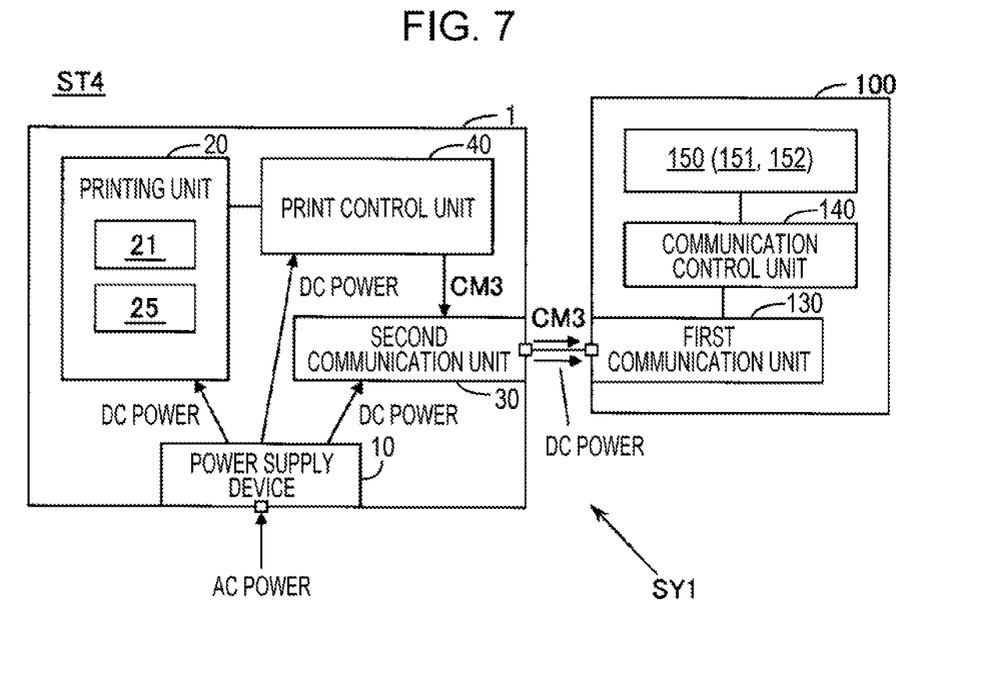
FIG. 7 is a block diagram schematically illustrating an example of a power supply state in a power-saving cancellation step.

In S116, the print control unit 40 of the printer 1 that completed printing may cause the second communication unit 30 to transmit the power-saving cancellation instruction CM3 that cancels the power saving state of the external apparatus 100. Such a state is illustrated in FIG. 7. When the power-saving cancellation instruction CM3 is transmitted, in the external apparatus 100, the first communication unit 130 receives the power-saving cancellation instruction CM3, and the communication control unit 140 and the power control unit 150 recognize the power-saving cancellation instruction CM3. Since the completion of printing is confirmed accordingly, the power control unit 150 may perform the process of S118 of cancelling the power saving state in response to the first communication unit 130 receiving the power-saving cancellation instruction CM3. When the external apparatus 100 can confirm or estimate the completion of printing without receiving the power-saving cancellation instruction CM3, it is unnecessary to transmit the power-saving cancellation instruction CM3. For example, when the printer 1 transmits the power-saving preservation period T1 to the external apparatus 100, switching to the power saving state is estimated when the power-saving preservation period T1 expires. Accordingly, the power control unit 150 of the external apparatus 100 may perform a process of determining expiration of the power-saving preservation period T1 by using the timer circuit 103 and perform the process of S118 of cancelling the power saving state in response to the expiration of the power-saving preservation period T1. In S118, the power control unit 150 of the external apparatus 100 may perform a power-saving cancellation process of causing the external apparatus 100 to enter the normal operation state from the power saving state.

When the power saving state occurs in a clock-down state, the clock control unit 151 of the power control unit 150 switches the operation clock of the CPU 101 from the frequency fd of the clock-down state to the frequency fn of the normal state. Accordingly, the external apparatus 100 performs the operation for the normal state at the original frequency fn, and a high rate process is performed in the external apparatus 100. Even when the power consumption of the external apparatus 100 increases, the DC power supplied from the power supply device 10 to the printing unit 20 has decreased, and thus the power supply device 10 can supply the DC power at a high conversion efficiency.

When the power saving state occurs in a sleep state, the sleep control unit 152 of the power control unit 150 switches the external apparatus 100 from the sleep state to the normal operation state. Accordingly, the external apparatus 100 performs the operation for the normal state. Even when the power consumption of the external apparatus 100 increases, the DC power supplied from the power supply device 10 to the printing unit 20 has decreased, and thus the power supply device 10 can supply the DC power at a high conversion efficiency.

Figure 8:
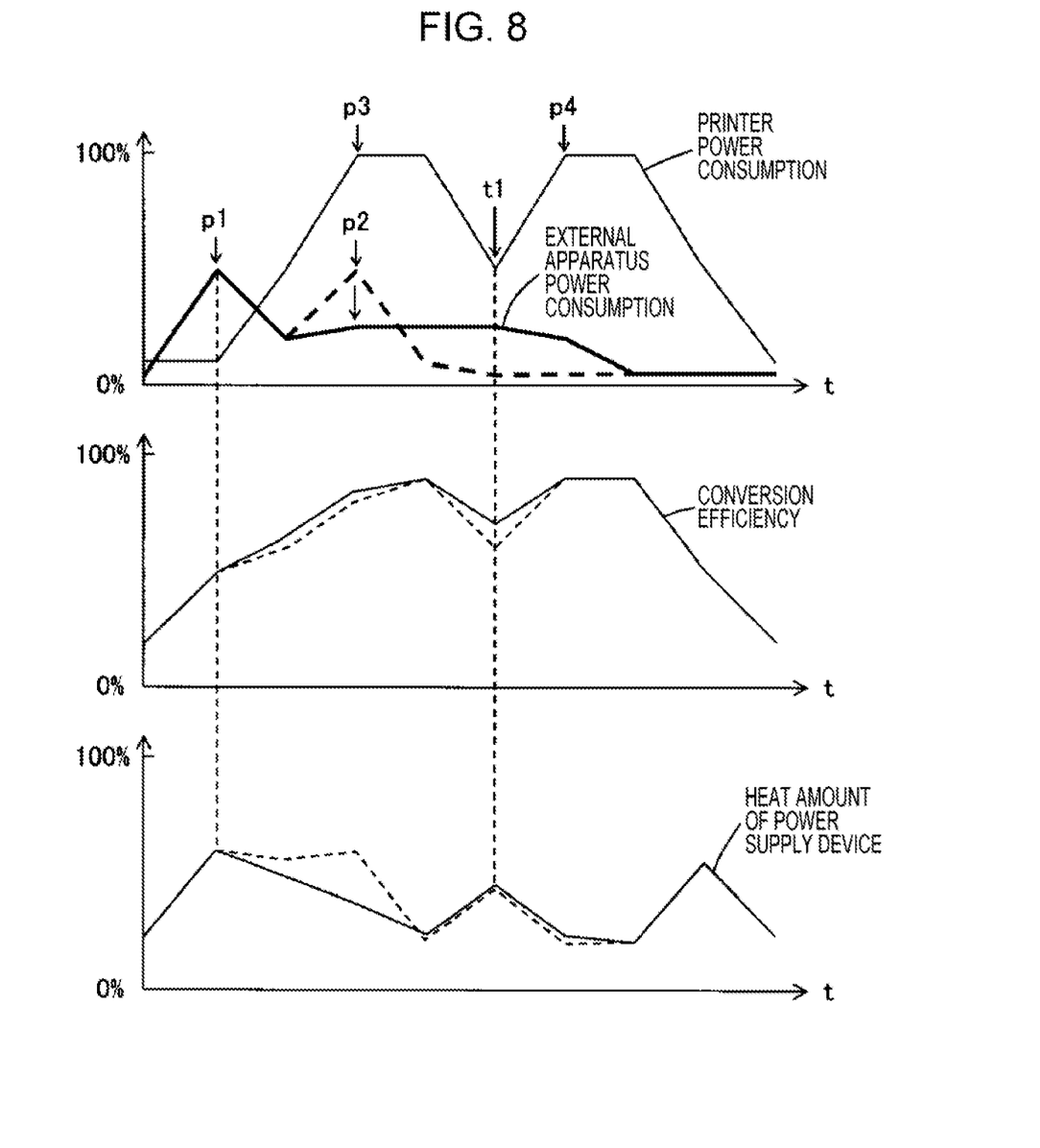
FIG. 8 is a diagram schematically illustrating an example of power consumption and conversion efficiency of an apparatus.

FIG. 8 schematically illustrates the power consumption and the conversion efficiency when two print jobs are continuously processed. In FIG. 8, the horizontal axis represents time t, the vertical axis of the upper graph represents percentage of relative power consumption of the printer 1 and the external apparatus 100, the vertical axis of the middle graph represents percentage of relative power conversion efficiency of the power supply device 10, and the vertical axis of the lower graph represents percentage of relative heat amount of the power supply device 10. In the upper graph, the thin solid line represents power consumption of the printer 1 except the power supply device 10 thereof, and the thick solid line represents power consumption of the external apparatus 100, and the thick dashed line represents power consumption of the external apparatus 100 expected when a power saving state is not enabled. In the middle graph, the dashed line represents conversion efficiency expected when the external apparatus 100 does not enter a power saving state. In the lower graph, the dashed line represents the heat amount of the power supply device 10 expected when the external apparatus 100 does not enter a power saving state. The power supply device 10 is designed such that the power conversion efficiency is the highest when the power consumption of the printer 1 is at the peak.

First, a peak p1 caused when print data in the latest print job is converted into the print command CM1 occurs in the power consumption of the external apparatus 100 in the normal operation state. When the print command CM1 is transmitted from the external apparatus 100 to the printer 1, the external apparatus 100 is notified of the power-saving-enabling instruction CM2 from the printer 1, and the external apparatus 100 enters a power saving state. FIG. 8 illustrates the power consumption and the conversion efficiency when the power saving state occurs in a clock-down state. When the external apparatus 100 is in the clock-down state, the printing unit 20 of the printer 1 performs printing, and the external apparatus 100 performs a low rate process that converts print data of the second print job into a print command. Accordingly, a peak p3 caused when printing is performed occurs in the power consumption of the printer 1, and a wide peak p2 caused when the print data in the second print job is converted into the print command CM1 occurs in the power consumption of the external apparatus 100. Since the peak p2 in the power saving state is lower than the peak p92 in the normal operation state illustrated in FIG. 11, the reduction in the power conversion efficiency of the power supply device 10 is reduced as illustrated in the middle graph of FIG. 8. Further, as illustrated in the lower graph of FIG. 8, the heat amount of the power supply device 10 is also reduced.

When the second print command CM1 is transmitted from the external apparatus 100 to the printer 1, a second peak p4 occurs in the power consumption of the printer 1. At the time t1 between the peak p3 and the peak p4, the external apparatus 100 in the power saving state continues the low rate process. Thus, at the time t1, the power consumption is larger than that in the case illustrated in FIG. 11, and the reduction in the power conversion efficiency of the power supply device 10 is reduced as illustrated in the middle graph of FIG. 8. Further, as illustrated in the lower graph of FIG. 8, the heat amount of the power supply device 10 is reduced.

As described above, the external apparatus 100 enters a power saving state in accordance with the power-saving-enabling instruction CM2 when the printer 1 performs printing in accordance with the print command CM1, and thereby the power consumption of the external apparatus 100 is suppressed at the time of printing that consumes much power. Accordingly, reduction in the power conversion efficiency of the power supply device 10 is suppressed. Further, when the printing unit 20 performs printing after the external apparatus 100 enters a power saving state, the power consumption of the external apparatus 100 is more reliably suppressed at the time of printing that consumes much power, and reduction in the power conversion efficiency of the power supply device 10 is further suppressed. Furthermore, when the power saving state of the external apparatus 100 is cancelled after completion of printing, the external apparatus 100 efficiently operates while suppressing reduction in the power conversion efficiency of the power supply device 10. Therefore, the present specific example may improve the power saving performance of the printer 1 that supplies power by USB to the external apparatus 100.

(4) Modified Examples

Various modified examples are possible for the present disclosure. The printer system 1 to which the present technology is applicable is not limited to the printer system illustrated in FIG. 1 and may be configured in any ways as long as a printer apparatus and an external apparatus are included. Therefore, an additional apparatus may be coupled to the Internet NE1, and it is not essential that the server computer SE1 or the mobile terminal 200 be provided in the printer system. When the external apparatus is a mobile terminal such as a smartphone, the mobile terminal supplied with power from a printer apparatus can transmit a print command to the printer apparatus and thereby cause the printer apparatus to perform printing in accordance with the print command. The print process illustrated in FIG. 3 is not limited to being performed by a CPU but may be performed by "another electronic component" such as Application Specific Integrated Circuit (ASIC). Further, the print process may be distributed and performed in a plurality of CPUs or may be distributed and performed in a CPU and "another electronic component".

(5) Conclusion

As described above, according to the present disclosure, a technology that improves power saving performance of a printer apparatus that supplies power by USB to an external apparatus can be provided in various forms. The basic effects and advantages described above are obtained even with the technology formed of only the components recited in the independent claims. Further, a configuration in which the components disclosed in the examples described above are replaced with each other or the combination thereof is changed, a configuration in which the known technology and the components disclosed in the examples described above are replaced with each other or the combination thereof is changed, or the like may be implemented. The present disclosure includes these configurations or the like.

What is claimed is:

1. A printer apparatus connected by a USB connection to a print instruction apparatus which instructs the printer apparatus, the printer apparatus comprising:
   a printing unit that performs printing;
   a communication unit that communicates with the print instruction apparatus via the USB connection; and
   a power supply device that supplies power to the print instruction apparatus which does not have a battery and operates from the power supplied by the power supply device, via the USB connection; and
   a print control unit that causes the printing unit to perform the printing in accordance with a print command received by the communication unit via the USB connection,
   wherein when the communication unit receives the print command, the print control unit causes the communication unit to transmit, via the USB connection, a power-saving-enabling instruction that instructs the print instruction apparatus to enter a power saving state, and
   the printing unit performs the printing after the print control unit causes the communication unit to transmit the power-saving-enabling instruction.

2. The printer apparatus according to claim 1, wherein the print control unit causes the printing unit to perform the printing after confirming that the print instruction apparatus entered the power saving state.

3. The printer apparatus according to claim 1, wherein the print control unit causes the communication unit to transmit a power-saving cancellation instruction that cancels the power saving state when the printing unit completes the printing.

4. The printer apparatus according to claim 1, wherein the print instruction apparatus converts print data into the print command and transmits the print command to the printing apparatus via the USB connection.

5. A printer system comprising:
   a printer apparatus that operates with power supplied by a power supply device; and
   a print instruction apparatus that operates with power supplied by the power supply device of the printer apparatus, wherein
   the print instruction apparatus comprises
   a first communication unit that is connected by a USB connection to the printer apparatus and receives the power from the printer apparatus,
   a communication control unit that causes the first communication unit to transmit a print command via the USB connection, and
   a power control unit that causes the print instruction apparatus to enter a power saving state when a power-saving-enabling instruction that instructs the print instruction apparatus to enter a power saving state is received by the first control unit via the USB connection, and
   the printer apparatus comprises
   a printing unit that performs printing,
   a second communication unit that is connected by the USB connection to the print instruction apparatus and supplies the power to the print instruction apparatus, and
   a print control unit that causes the printing unit to perform the printing in accordance with the print command received by the second communication unit via the USB connection, wherein
   the print control unit causes the second communication unit to transmit the power-saving-enabling instruction via the USB connection when the communication unit receives the print command, and
   the printing unit performs the printing after the print control unit causes the communication unit to transmit the power-saving-enabling instruction.

6. The printer system according to claim 5, wherein the print control unit causes the printing unit to perform the printing after confirming that the print instruction apparatus entered the power saving state.

7. The printer system according to claim 5, wherein the print control unit causes the second communication unit to transmit a power-saving cancellation instruction that cancels the power saving state when the printing unit completes the printing.

8. A print method for a printer apparatus that operates with power supplied by a power supply device, that is connected by a USB connection to a print instruction apparatus that operates with power supplied by the power supply device of the printer apparatus, the USB connection configured to supply power to the print instruction apparatus and transmit communication data between the printer apparatus and the print instruction apparatus, the print method comprising:
   a print command reception step of receiving a print command from the print instruction apparatus via the USB connection;
   a power-saving-enabling instruction step of transmitting, to the print instruction apparatus, a power-saving-enabling instruction via the USB connection that instructs the print instruction apparatus to enter a power saving state after the print command reception step; and
   a printing step of performing printing in accordance with the print command after the power-saving-enabling instruction step.

9. The print method according to claim 8, performing the printing after confirming that the print instruction apparatus entered the power saving state.

10. The print method according to claim 8, wherein transmitting a power-saving cancellation instruction that cancels the power saving state when completing the printing.

* * * * *